United States Patent [19]

Matteodo et al.

[11] Patent Number: 4,869,841
[45] Date of Patent: Sep. 26, 1989

[54] PROCESS FOR THE TREATMENT OF AQUEOUS FLUIDS TO REDUCE CORROSION COMPRISING DICARBOXYLIC ALIPHATIC ACID SALT AND POLYOL

[75] Inventors: Jean B. Matteodo; Marcel Tucoulat, both of Martigues; Michel Pascal-Mousselard, Aix en Provence, all of France

[73] Assignee: BP Chimie S.A., Lavera, France

[21] Appl. No.: 734,818

[22] Filed: May 16, 1985

Related U.S. Application Data

[63] Continuation of Ser. No. 560,454, Dec. 12, 1983, abandoned.

[30] Foreign Application Priority Data

Dec. 27, 1982 [FR] France .................... 82 21796

[51] Int. Cl.$^4$ ................................. C09K 5/00
[52] U.S. Cl. ..................... 252/79; 252/71; 252/73; 252/387; 252/388; 252/396
[58] Field of Search ............ 252/560, 459, 74, 79, 252/76, 73, 392, 390, 396; 422/17

[56] References Cited

U.S. PATENT DOCUMENTS

| | | |
|---|---|---|
| 2,726,215 | 12/1955 | Jones . |
| 3,029,204 | 4/1962 | Matuszak et al. ............ 252/396 X |
| 3,712,862 | 1/1973 | Bundrant et al. ............ 252/396 X |
| 3,907,578 | 9/1975 | Scherrer et al. ............... 422/17 X |
| 4,153,464 | 5/1979 | Sturwold et al. ............ 252/396 X |
| 4,191,801 | 3/1980 | Jahnke ........................... 252/396 X |
| 4,250,042 | 2/1981 | Higgins ........................... 422/17 X |
| 4,382,008 | 5/1983 | Boreland et al. ............ 252/396 X |

FOREIGN PATENT DOCUMENTS

0893290 4/1962 United Kingdom .

*Primary Examiner*—Paul R. Michl
*Assistant Examiner*—Hoa Van Le
*Attorney, Agent, or Firm*—Brooks Haidt Haffner & Delahunty

[57] ABSTRACT

The invention relates to a process making it possible to reduce the corrosion of metals and alloys of heat exchanger circuits where aqueous heat transfer fluids are circulating and which may contain anti-freeze products.

The process consists in mixing with these aqueous heat transfer fluids on the one hand from 0.05 to 5 percent by weight of one or more salts of alkali metals or of amines of dicarboxylic aliphatic acids of the formula $(CH_2)_n(COOH)_2$ in which n is comprised between 2 and 10 and on the other hand from 0.05 to 2.5 percent by weight of one or more polyols comprising a number of carbon atoms between 5 and 12 and a number of alcohol functions between 5 and 12 and possessing no reducing power.

12 Claims, No Drawings

PROCESS FOR THE TREATMENT OF AQUEOUS FLUIDS TO REDUCE CORROSION COMPRISING DICARBOXYLIC ALIPHATIC ACID SALT AND POLYOL

This application is a continuation of application Ser. No. 560,454, filed Dec. 12, 1983, now abandoned.

The present invention relates to a process for the treatment of aqueous heat transfer fluids employed in the cooling or heating circuits of heat exchangers with a view to reducing the corrosion of metals in contact with these fluids.

It is known that one can utilise heat transfer fluids consisting mainly of water in heat exchangers such as for example central heating circuits or cooling circuits of internal combustion engines. Generally the heat transfer fluid comes in contact with various metals or alloys making up the various parts of these circuits, such as for example copper, brass, steel, cast iron, aluminium and tin alloys making up the welds. Thus the problems of corrosion become particularly difficult and complex, not only because of the need to protect individually each of the metals or alloys from corrosion, but also because of electrolytic phenomena which may appear between the various metals or alloys present.

In the case of certain heat exchanger circuits such as those for cooling internal combustion engines, especially those operating on automotive vehicles, the problems of corrosion protection are bound up in particular with the fact that the aqueous heat transfer fluids employed generally contain anti-freeze agents, especially during the winter. These anti-freeze agents generally consist of organic compounds such as monoethyleneglycol, monopropyleneglycol or their next higher homologues. A small proportion of various additives such as for example corrosion inhibitors is usually added to these anti-freeze agents. The anti-freeze compositions thus obtained are mixed with water to prepare the heat transfer fluid ready for use. The ratio of the quantity of anti-freeze to that of water is determined by the desired freezing point of the fluid. It may for example vary between 0.1 and 1.0 by weight.

Numerous corrosion inhibitors soluble in water, in monoethyleneglycol, monopropyleneglycol or their next higher homologues are already known. Mostly these are mineral inhibitors such as for example salts of alkali metals, such as chromates, bichromates, nitrites, silicates, phosphates, polyphophates and borates. However, these corrosion inhibitors have serious drawbacks. Thus, for example, chromates and bichromates are toxic compounds, nitrites may be decomposed by bacteria, phosphates and polyphosphates are not very well compatible with hard water, silicates may slowly be deposited on the walls of the heat exchangers in the form of hydrated silica gel, and borates may cause an unacceptable increase in the corrosion of aluminium and tin alloys making up the welds of the circuits.

It is also known that one can use organic corrosion inhibitors, such as for example amines or benzoates. Although cartain amines are not generally considered as toxic substances, it may happen that during the mixing of various anti-freeze agents in the same cooling circuit, a nitrosamine regarded as carcinogenic is formed by the reaction between an amine and a nitrite. Benzoates, on the other hand, in order to provide effective protection against metal corrosion, have to be used at a relatively high concentration and be associated with other corrosion inhibitors such as nitrites, which limits their usefulness.

Other corrosion inhibitors such as the salts of monocarboxylic or dicarboxylic acids such as succinic acid and adipic acid have also been employed. These corrosion inhibitors, which have to be used at a relatively high concentration, are only effective with respect to steel and cast iron.

It is also known that one can use polyols as corrosion inhibitors, especially pentols, hexols or sugars, such as sorbitol, galactose, glucose, fructose and maltose. These polyols are excellent corrosion inhibitors for aluminium or its alloys. However, their efficacy is restricted to this metal, with the additional proviso that the said metal is not in contact with other metals.

Lastly, it is known that one can use the alkaline salts of hydroxylated polycarboxylic acids, such as those of citric acid, malic acid, tartaric acid or mucic acid. These additives have the advantage of being non-toxic and being biodegradable, but they are not sufficiently effective to control corrosion of the majority of usual metals.

The Applicants have now found that the simultaneous addition of certain salts of dicarboxylic aliphatic acids and certain polyols to the aqueous heat transfer fluid makes it possible to obtain by a synergistic effect an extremely effective protection against corrosion for cast iron, aluminium and its alloys, and welds based on tin, in contact with these aqueous fluids. This new pair of corrosion inhibitor additives also provides a good protection for steel.

The present invention therefore relates to a process for the treatment of aqueous fluids employed in heat exchangers, with a view of reducing the corrosion of metals or alloys in contact with these fluids, the process being characterised by the fact that there is added to the aqueous fluids 0.05 to 5 percent by weight, preferably 0.1 to 2.5 percent by weight, of one or more salts of alkali metals or amines of dicarboxylic acids, of the formula $(CH_2)_n(COOH)_2$ in which n is comprised between 2 and 10, and 0.05 to 2.5 percent by weight, preferably 0.1 to 1.5 percent by weight of one or more polyols, comprising a number of carbon atoms between 5 and 12 and a number of alcohol functions between 5 and 12 and not possessing any reducing power.

According to the invention one or more salts of alkali metals, especially the salts of sodium and potassium, or of amines, especially alkanolamines such as the triethanolamine of any of the dicarboxylic aliphatic acids of the formula $(CH_2)_n(COOH)_2$ cited above can be used. However, it is preferred to use the sodium salts of the dicarboxylic aliphatic acids where $4 \leq n \leq 10$.

These salts may be formed by the addition to the aqueous heat transfer fluids on the one hand of dicarboxylic aliphatic acid and on the other hand of a hydroxide of an alkali metal or an amine in a stiochiometric quantity.

As polyols one may use in accordance with the invention pentols, hexols, and sugars not possessing any reducing power. However, it is preferred to use sorbitol, xylitol, mannitol and saccharose. In the case of an aqueous heat transfer fluid containing an anti-freeze agent such as monoethyleneglycol, monopropyleneglycol or their next higher homologues, it may be advantageous to add the corrosion inhibitor additives according to the invention to the anti-freeze agent itself prior to mixing the latter with water. In this case one obtains an anti-freeze composition containing from 0.5 to 8 percent by weight, preferably from 1 to 5 percent by weight, of a salt of dicarboxylic aliphatic acid, and from 0.5 to 5 percent by weight, preferably 1 to 3 percent by weight of polyol.

One may also add to the aqueous heat transfer fluids or to the anti-freeze compositions employed to produce them, other additives such as certain specific corrosion inhibitors, such as tolutriazole and/or sodium metasilicate, mineral or organic bases intended to neutralise the acid and which may constitute an alkaline reserve such as alkanolamines, buffering agents such as decahydrated sodium tetraborate, anti-foaming agents and deposit-preventing agents such as polyaddition products of ethylene oxide and propylene oxide on water or an alcohol.

Thus an anti-freeze composition employed to produce an aqueous cooling fluid for internal combustion engines may be obtained by mixing:

- 85 percent to 95 percent by weight of glycol such as monoethyleneglycol, monopropyleneglycol or their next higher homologues,
- 0.5 to 5 percent by weight of one or more polyols comprising a number of carbon atoms between 5 and 12 and a number of alcohol functions between 5 and 12, and not possessing any reducing power,
- 0.5 to 5 percent by weight of one or more dicarboxylic aliphatic acids, of the formula $(CH_2)_n(COOH)_2$ in which n is comprised between 2 and 10,
- an alkali hydroxide such as sodium hydroxide or potassium hydroxide in a stoichiometrical quantity to form the alkaline salt of the dicarboxylic aliphatic acid or acids employed,
- 0 to 2.50 percent by weight of a primary, secondary or tertiary alkanolamines, such as monoethanolamine, monopropanolamine, or triethanolamine,
- 0.5 to 1percent by weight of a salt of an alkali metal or of an ammonium salt of boric acid, such as decahydrated sodium tetraborate, known as "Borax",
- 0.025 to 1 percent by weight of a corrosion inhibitor for copper and its alloys, chosen from among the heterocyclic or polycyclic nitrogenous compounds such as tolutriazole, benzotriazole, or an aminated derivative of benzotriazole with the formula:

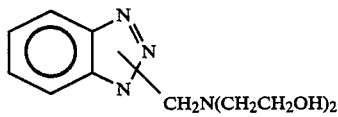

- 0.025 to 0.25, more particularly 0.025 to 0.15 percent by weight of an alkali metal silicate or ammonium silicate, preferably a hydrated sodium metasilicate,
- 0.005 to 0.025 percent by weight of a sequenced or statistical polyaddition product of ethylene oxide and propylene oxide to water.

Such an anti-freeze composition may be mixed with water at the rate of 0.1 to 1 part by weight per part by weight of water, to form an aqueous heat transfer fluid which is particularly suitable for preventing the development of corrosion of metals and alloys with which it may be in contact, such as cast iron, steel, aluminium and its alloys, copper and its alloys, and also welds on a tin basis.

The present invention is illustrated by the followimg Examples.

EXAMPLE 1

An anti-freeze composition on a monoethyleneglycol basis is prepared by mixing, and containing as additives:
- 2.00 percent by weight sorbitol,
- 2.35 percent by weight adipic acid,
- 1.30 percent by weight soda (stiochiometrical quantity for forming disodium adipate).
- 1.30 percent by weight triethanolamine,
- 0.75 percent by weight decahydrated sodium tetraborate,
- 0.10 percent by weight tolutriazole,
- 0.10 percent by weight metasilicate and
- 30 ppm of anti-foaming agent.

Tests on the corrosion resistance of metal testpieces are carried out by immersion in a solution in water of the anti-freeze composition prepared previously. The qualities of the metals or alloys used, and also all the operating conditions of these tests are defined by Standard ASTM D 1384/70. The corrosion is demonstrated by the variation in weight of each testpiece (expressed in milligrammes) at the end of a given time. The results are given in Table I.

The anti-corrosion properties of the additive system employed are excellent for all the metals or alloys examined, since the variations in weight per testpiece are always much less than 10 mg, the figure considered as the limit of acceptable corrosion.

EXAMPLES 2 TO 5

In these Examples one operates as in Example 1, except that during the preparation of the anti-freeze composition instead of 2.35 percent by weight of adipic acid and 1.30 percent by weight of soda one uses:
- 2.35 percent by weight of sebacic acid and 0.95 percent by weight of soda, in Example 2;
- 2.35 percent by weight of succinic acid and 1.60 percent by weight of soda, in Example 3;
- 1.50 percent by weight of azelaic acid and 0.65 percent by weight of soda, in Example 4;
- 2.35 percent by weight of a mixture of acids consisting of 0.70 percent by weight of succinic acid, 1.05 percent by weight of glutaric acid, 0.60 percent by weight of adipic acid and 1.45 percent by weight of soda, in Example 5.

The results of Examples 2 to 5 are given in Table I. An examination of this table shows that the association of sorbitol with the sodium salts of various dicarboxylic aliphatic acids leads to excellent anti-corrosion properties in respect of the metals and alloys under consideration.

EXAMPLES 6 TO 10

In comparative Examples 6 and 7, one operates as in Example 1, except that during the preparation of the anti-freeze composition, instead of 2.0 percent by weight of sorbitol, 2.35 percent by weight of adipic acid and 1.3 percent by weight of soda, one uses
- 4.0 percent by weight of sebacic acid and 1.60 percent by weight of soda, in Comparative Example 6;
- 2.00 percent by weight of sebacic acid and 0.80 percent by weight of soda, in Comparative Example 7.

In Examples 8 and 9 one operates as in Example 1, except that during the preparation of the anti-freeze composition, instead of 2.35 percent by weight of adipic acid and 1.30 percent by weight of soda, one uses:
- 1.00 percent by weight of sebacic acid and 0.40 percent by weight soda, in Example 8;

no dicarboxylic aliphatic acid and no soda in Comparative Example 9

In Comparative Example 10, one operates as in Example 1, except that during the preparation of the antifreeze composition, instead of 2.00 percent by weight of sorbitol, 2.35 percent by weight of adipic acid and 1.30 percent by weight of soda, one uses solely 4.00 percent by weight of sorbitol.

The results of Examples 6 to 10 are colected in Table II. An examination of this table shows that the simultaneous addition of sorbitol and a small quantity of the sodium salt of sebacic acid makes it possible to obtain in a surprising manner an extremely effective protection against corrosion of the tin-based welds, of cast iron and aluminium in contact with the aqueous heat transfer fluid.

EXAMPLES 11 AND 12

In these Examples one operates as in Example 1, except that during the preparation of the anti-freeze composition, instead of 2.35 percent by weight of adipic acid and 1.30 percent by weight of soda, one uses:
2.00 percent by weight of adipic acid and 1.10 percent by weight of soda, in Example 11;
1.00 percent by weight of adipic acid and 0.55 percent by weight of soda, in Example 12;

The results of Examples 11 and 12 and also those of Examples 1 and 9 are collected in Table III. An analysis of this table shows in particular that at a constant concentration of sorbitol, there exists a concentration threshold for the sodium salt of adipic acid below which the protection of cast iron, steel, aluminium and tin-based welds is no longer adequately ensured (variation in weight of the testpiece of over 10 mg).

EXAMPLES 13 AND 14

In these Examples one operates as in Example 1, except that during the preparation of the anti-freeze composition, instead of 2.00 percent by weight of sorbitol one uses:
no sorbitol in comparative Example 13;
1.00 percent by weight of sorbitol in Example 14.

The results of Examples 13 and 14 and also those of Example 1 are collected in Table IV. An examination of this table makes it possible to demonstrate that at a constant concentration of the sodium salt of adipic acid, there exists a minimum sorbitol concentration for providing good protection agaist the corrosion of cast iron, aluminium and tin-based welds.

EXAMPLES 15 TO 19

In these Examples one operates as in Example 1, except that during the preparation of the anti-freeze composition, instead of 2.00 percent by weight of sorbitol one uses:

2.00 percent by weight of mannitol, in Example 15;
2.00 percent by weight of saccharose, in Example 16;
2.00 percent by weight of glucose in Comparative Example 17;
2.00 percent by weight of maltose, in Comparative Example 18.

Finally, in Example 19 one operates as in Example 1, except that for the preparation of the anti-freeze composition, instead of 2.00 percent by weight of sorbitol, 2.35 percent by weight of adipic acid and 1.30 percent by weight of soda, one uses solely 2.35 percent by weight of sorbitol adipate.

The results of Examples 15 to 19 are collected in Table V. An examination of this table shows the influence of the nature of the polyol employed in association with the sodium salt of adipic acid on the anti-corrosion properties. According to these Examples one may use a polyol of the hexol type, such as mannitol (Example 15), and also a sugar of the disaccharide type, which has no reducing power, such as saccharose (Example 16), in association with the sodium salt of adipic acid to obtain excellent anti-corrosion properties on the metals examined.

On the other hand, sugars having a reducing power of the aldose type, such as glucose, (Example 17) or the disaccharide type, such as maltose (Example 18), in association with the sodium salt adipic acid, lead to anti-corrosion systems with very little efficacy, especially in respect of cast iron and copper.

According to Example 19, instead of soda one uses the couple consisting of adipic acid and sorbitol in the form of sorbitol adipate. The anti-corrosion properties of the inhibitor system are relatively mediocre, especially in respect of cast iron and welding.

EXAMPLES 20 AND 21

In these Examples one operates as in Example 1, except that during the preparation of the anti-freeze composition, instead of 2.00 percent by weight of sorbitol, 2.35 percent by weight of adipic acid and 1.30 percent by weight of soda, one uses:
2.00 percent by weight of saccharose, 1.50 percent by weight of azelaic acid and 0.65 percent by weight of soda, in Example 20;
2.00 percent by weight if saccharose, 1.00 percent by weight of sebacic acid and 0.40 percent by weight of soda, in Example 21.

The results of Examples 20 and 21 and those of Example 16 are collected in Table VI. An examination of this table shows that the associations of saccharose with the sodium salt of azelaic acid (Example 20) and saccharose with the sodium salt of sebacic acid (Example 21) have a remarkable action as corrosion inhibitors for all the metals and alloys examined at very low acid concentrations.

TABLE 1

| | Polyol | | Dicarboxylic acid | | Variations in weight in mg per testpiece (ASTM D 1384/70) | | | | | |
|---|---|---|---|---|---|---|---|---|---|---|
| Example | Type | % by weight | Type | % by weight | Copper | Weld | Brass | Steel | Cast iron | Aluminium |
| 1 | Sorbitol | 2.0 | Adipic acid | 2.35 | −1 | −1 | −2 | +1 | −2 | +3 |
| 2 | " | 2.0 | Sebacic acid | 2.35 | −1 | −1 | −2 | 0 | 0 | −1 |
| 3 | " | 2.0 | Succinic acid | 2.35 | −1 | −1 | −1 | 0 | −2 | 0 |
| 4 | " | 2.0 | Azelaic acid | 1.50 | −3 | −3 | −2 | ?1 | +2 | +2 |
| 5 | " | 2.0 | Mixture of acids | 2.35 | −5 | −3 | −3 | +3 | −6 | +2 |

TABLE II

| | Polyol | | Dicarboxylic acid | | Variations in weight in mg per testpiece (ASTM D 1384/70) | | | | | |
|---------|---------|----------|--------------|--------|--------|------|-------|-------|-----------|-----------|
| Example | Type | % by weight | Type | % by weight | Copper | Weld | Brass | Steel | Cast iron | Aluminium |
| 6 | — | — | Sebacic acid | 4.0 | −4 | −8 | −5 | 0 | −4 | −7 |
| 7 | — | — | " | 2.0 | −3 | −16 | −3 | 0 | −15 | −20 |
| 8 | Sorbitol | 2.0 | " | 1.0 | −3 | −2 | −2 | 0 | +1 | +2 |
| 9 | " | 2.0 | — | — | −5 | −15 | −6 | −40 | −62 | −15 |
| 10 | " | 4.0 | — | — | −6 | −13 | −9 | −45 | −74 | −9 |

TABLE III

| | Polyol | | Dicarboxylic acid | | Variations in weight in mg per testpiece (ASTM D 1384/70) | | | | | |
|---------|---------|----------|-------------|--------|--------|------|-------|-------|-----------|-----------|
| Example | Type | % by weight | Type | % by weight | Copper | Weld | Brass | Steel | Cast iron | Aluminium |
| 1 | Sorbitol | 2.0 | Adipic acid | 2.35 | −1 | −1 | −2 | +1 | −2 | +3 |
| 11 | " | 2.0 | " | 2.00 | −3 | −5 | −3 | 0 | −6 | −3 |
| 12 | " | 2.0 | " | 1.00 | −2 | −6 | −3 | 0 | −12 | −3 |
| 9 | " | 2.0 | — | — | −5 | −15 | −6 | −40 | −62 | −15 |

TABLE IV

| | Polyol | | Dicarboxylic acid | | Variations in weight in mg per testpiece (ASTM D 1384/70) | | | | | |
|---------|----------|----------|-------------|--------|--------|------|-------|-------|-----------|-----------|
| Example | Type | % by weight | Type | % by weight | Copper | Weld | Brass | Steel | Cast iron | Aluminium |
| 13 | — | — | Adipic Acid | 2.35 | −3 | −20 | −3 | 0 | −17 | −25 |
| 14 | Sorbitol | 1.0 | " | 2.35 | −4 | −12 | −4 | −3 | −8 | −14 |
| 1 | " | 2.0 | " | 2.35 | −3 | −1 | −2 | +1 | −2 | +3 |

TABLE V

| | Polyol | | Dicarboxylic acid | | Variations in weight in mg per testpiece (ASTM D 1384/70) | | | | | |
|---------|-----------|----------|------------------|--------|--------|------|-------|-------|-----------|-----------|
| Example | Type | % by weight | Type | % by weight | Copper | Weld | Brass | Steel | Cast iron | Aluminium |
| 15 | Mannitol | 2.0 | Adipic acid | 2.35 | 0 | −2 | −1 | +1 | −1 | 0 |
| 16 | Saccharose | 2.0 | " | 2.35 | −3 | −4 | −3 | −2 | −6 | +3 |
| 17 | Glucose | 2.0 | " | 2.35 | Test broken off after 12 hours: solution very stained, very marked corrosion of cast iron in particular. | | | | | |
| 18 | Maltose | 2.0 | " | 2.35 | Test broken off after 48 hours: solution very stained marked corrosion of cast iron, electrolytic transfer of cuprous ions | | | | | |
| 19 | — | — | Sorbitol adipate | 2.35 | −6 | −12 | −5 | −3 | −15 | −5 |

TABLE VI

| | Polyol | | Dicarboxylic acid | | Variations in weight in mg per testpiece (ASTM D 1384/70) | | | | | |
|---------|-----------|----------|--------------|--------|--------|------|-------|-------|-----------|-----------|
| Example | Type | % by weight | Type | % by weight | Copper | Weld | Brass | Steel | Cast iron | Aluminium |
| 16 | Saccharose | 2.0 | Adipic Acid | 2.35 | −3 | −4 | −3 | −2 | −6 | +3 |
| 20 | " | 2.0 | Azelaic acid | 1.50 | −2 | −2 | −2 | −2 | +1 | +2 |
| 21 | " | 2.0 | Sebacic acid | 1.00 | −2 | −2 | −2 | 0 | −1 | 0 |

We claim:

1. Process for the treatment of aqueous heat transfer fluids employed in the heating or cooling circuits of heat exchangers, for reducing the corrosion of metals and alloys in contact with these fluids, which process is characterised by the fact that there is added to the aqueous heat transfer fluids by way of corrosion inhibitors, from 0.05 to 5 percent by weight of one or more salts of alkali metals or amines of dicarboxylic aliphatic acids, of the formula $(CH_2)_n(COOH)_2$, in which n is between 2 and 10, and from 0.05 to 2.5 percent by weight of one or more polyols having a number of carbon atoms between 5 and 12 and a number of alcohol functions between 5 and 12 and not possessing any reducing power.

2. Process in accordance with claim 1, characterised by the fact that the salts of the dicarboxylic aliphatic acids used are sodium or potassium salts, or salts of amines or of alkanolamines of adipic acid, azelaic acid, succinic acid, or sebacic acid, and by the fact that the polyols used are sorbitol, xylitol, mannitol or saccharose.

3. Process accordance with claim 1, characterised by the fact that the aqueous heat transfer fluids consist of:
   50 to 90 percent by weight of water, and of
   10 to 50 percent by weight of anti-freeze on the basis of monoethyleneglycol, monopropyleneglycol or their next higher homologues.

4. Process in accordance with claim 1, characterised by the fact that the aqueous heat transfer fluid contains a minor but effective amount of various additives comprising buffering agents, anti-foaming agents and deposit-preventing agents, and also other corrosion inhibitors.

5. A process for the treatment of anti-freeze containing, heat transfer fluids employed in the heating or cooling circuits of heat exchangers, for reducing the corrosion of metals and alloys in contact with these fluids, which process is characterised by the fact that there is added to the anti-freeze by way of corrosion inhibitors, 0.5 to 8 percent by weight in relation to the anti-freeze of one or more salts of alkali metals or amines of dicarboxylic aliphatic acids, of the formula $(CH_2)_n(COOH)_2$, in which n is between 2 and 10, and 0.5 to 5 percent by weight in relation to the anti-freeze of one or more polyols having a number of carbon atoms between 5 and 12 and a number of alcohol functions between 5 and 12 and not possessing any reducing power, prior to mixing the anti-freeze with water.

6. A corrosion inhibiting additive composition comprising an effective amount of one or more salts of alkali metals or amines of dicarboxylic aliphatic acids, of the formula $(CH_2)_n(COOH)_2$, in which n is between 2 and 10, and an effective amount of one or more polyols having a number of carbon atoms between 5 and 12 and a number of alcohol functions between 5 and 12 and not possessing any reducing power.

7. The composition in accordance with claim 6, characterised by the fact that the salts of the dicarboxylic aliphatic acids used are sodium or potassium salts, or salts of amines or of alkanolamines of adipic acid, azelaic acid, succinic acid, or sebacic acid, and by the fact that the polyols used are sorbitol, xylitol, mannitol or saccharose.

8. An anti-freeze heat transfer fluid composition comprising an anti-freeze agent containing as corrosion inhibitors, from 0.5 to 8 percent by weight in relation to the anti-freeze of one or more salts of alkali metals or amines of dicarboxylic aliphatic acids, of the formula $(CH_2)_n(COOH)_2$, in which n is between 2 and 10, and from 0.5 to 5 percent by weight in relation to the anti-freeze of one or more polyols having a number of carbon atoms between 5 and 12 and a number of alcohol functions between 5 and 12 and not possessing any reducing power.

9. The composition in accordance with claim 8, characterised by the fact that the salts of the dicarboxylic aliphatic acids used are sodium or potassium salts, or salts of amines or of alkanolamines of adipic acid, azelaic acid, succinic acid, or sebacic acid, and by the fact that the polyols used are sorbitol, xylitol, mannitol or saccharose, and further characterised by the fact that the anti-freeze agent is based on monoethyleneglycol, monopropyleneglycol or their next higher homologues.

10. The composition in accordance with claim 8, characterised by the fact that the anti-freeze composition further contains an effective amount of an additive comprising a buffering agent, an anti-foaming agent, a deposit-preventing agent, and also another corrosion inhibitor.

11. An aqueous heat transfer fluid composition comprising from 50 to 90 percent by weight of water, and from 10 to 50 percent by weight of anti-freeze, which composition is characterised by the fact that there is added to the aqueous heat transfer fluid by way of corrosion inhibitors, from 0.05 to 5 percent by weight of one or more salts of alkali metals or amines of dicarboxylic aliphatic acids, of the formula $(CH_2)_n(COOH)_2$, in which n is between 2 and 10, and from 0.05 to 2.5 percent by weight of one or more polyols having a number of carbon atoms between 5 and 12 and a number of alcohol functions between 5 and 12 and not possessing any reducing power.

12. The composition in accordance with claim 11 characterised by the fact that the salts of the dicarboxylic aliphatic acids used are sodium or potassium salts, or salts of amines or of alkanolamines of adipic acid, azelaic acid, succinic acid, or sebacic acid, and by the fact that the polyols used are sorbitol, xylitol, mannitol or saccharose, and further characterised by the fact that the anti-freeze is based on monoethyleneglycol, monopropyleneglycol or their next higher homologues.

* * * * *

UNITED STATES PATENT AND TRADEMARK OFFICE
CERTIFICATE OF CORRECTION

PATENT NO. : 4,869,841

DATED : September 26, 1989

INVENTOR(S) : JEAN B. MATTEODO et al

It is certified that error appears in the above-identified patent and that said Letters Patent is hereby corrected as shown below:

Col. 1, line 61, correct spelling of word "certain"

Col. 2, line 55, correct spelling of word "stoichiometric"

Col. 2, line 60, "In the case" should start a new paragraph.

Col. 4, line 7, correct spelling of word "stoichiometrical"

Col. 5, line 26, after "Example 12" change the semicolon (;) to a period (.)

Claim 3, line 1, after "Process" insert --in--.

Signed and Sealed this

Second Day of April, 1991

*Attest:*

HARRY F. MANBECK, JR.

*Attesting Officer*     *Commissioner of Patents and Trademarks*